(12) United States Patent
Rigazio et al.

(10) Patent No.: US 8,666,728 B2
(45) Date of Patent: Mar. 4, 2014

(54) VISUAL FEEDBACK BASED ON INTERACTION LANGUAGE CONSTRAINTS AND PATTERN RECOGNITION OF SENSORY FEATURES

(75) Inventors: Luca Rigazio, San Jose, CA (US);
David Kryze, Campbell, CA (US);
Philippe Morin, Goleta, CA (US)

(73) Assignee: Panasonic Corporation, Osaka (JP)

( * ) Notice: Subject to any disclaimer, the term of this patent is extended or adjusted under 35 U.S.C. 154(b) by 1100 days.

(21) Appl. No.: 12/666,930

(22) PCT Filed: Jun. 26, 2008

(86) PCT No.: PCT/US2008/068365
§ 371 (c)(1),
(2), (4) Date: Dec. 28, 2009

(87) PCT Pub. No.: WO2009/006209
PCT Pub. Date: Jan. 8, 2009

(65) Prior Publication Data
US 2011/0010648 A1    Jan. 13, 2011

Related U.S. Application Data

(63) Continuation of application No. 11/977,331, filed on Oct. 24, 2007, now Pat. No. 8,170,869.

(60) Provisional application No. 60/946,830, filed on Jun. 28, 2007.

(51) Int. Cl.
*G06F 17/27* (2006.01)
*G10L 21/00* (2013.01)
*G06F 3/00* (2006.01)

(52) U.S. Cl.
USPC .............................. 704/9; 704/270; 715/700

(58) Field of Classification Search
USPC ............... 704/9, 270, 275; 715/700, 812, 856
See application file for complete search history.

(56) References Cited

U.S. PATENT DOCUMENTS

| | | | |
|---|---|---|---|
| 5,652,630 | A | 7/1997 | Bertram et al. |
| 5,724,106 | A | 3/1998 | Autry et al. |
| 6,396,523 | B1 | 5/2002 | Segal et al. |
| 6,418,424 | B1 | 7/2002 | Hoffberg et al. |
| 6,765,557 | B1 | 7/2004 | Segal et al. |
| 7,139,983 | B2 | 11/2006 | Kelts |
| 2003/0046401 | A1 | 3/2003 | Abbott et al. |
| 2006/0004680 | A1 | 1/2006 | Robarts et al. |
| 2008/0076472 | A1 | 3/2008 | Hyatt |

FOREIGN PATENT DOCUMENTS

JP    2005-044220 A    2/2005

*Primary Examiner* — Angela A Armstrong
(74) *Attorney, Agent, or Firm* — Harness, Dickey & Pierce, P.L.C.

(57) ABSTRACT

A language model back-off system can be used with a user interface employing one or more language models to constrain navigation of selectable user interface input components. A user input interpretation module receives user input and interprets the user input to determine if a selection is made of one or more user interface input components. If a selection is not made, the user input interpretation module determines whether conditions are met for backing off one or more language models employed to constrain navigation of the user interface input components. If the conditions are met, a language model back-off module backs off the one or more language models.

15 Claims, 4 Drawing Sheets

VISUAL FEEDBACK BASED ON INTERACTION LANGUAGE CONSTRAINTS AND PATTERN RECOGNITION OF SENSORY FEATURES

CROSS-REFERENCE TO RELATED APPLICATIONS

This application claims the benefit of U.S. Patent Applications Nos. 60/946,830 and 11/977,331 filed on Jun. 28, 2007 and Oct. 24, 2007, respectively. The disclosures of the above applications are incorporated herein by reference.

FIELD

The present disclosure generally relates to user interfaces, and relates in particular to user interfaces employing language constraints to help the user navigate and perform selections.

BACKGROUND

The statements in this section merely provide background information related to the present disclosure and may not constitute prior art.

A user interface can rely on a touch-sensitive controller or other pointer device and an on-screen interface. Such an interface can employ language constraints to help the user navigate through the user interface and make easier/faster selections. Such an interface can also employ the language constraints to augment visual feedback in a way that will better guide the user.

Herein, language means a collection of symbols that can be related to different UI elements (distributed in space, for instance on the screen), and that has some inherent constraints (such as N-grams constraints). An example application can be an on-screen keyboard driven by a touch-sensitive remote controller. Such an application can be an important enabling technology for the next generation Internet enabled TV, where interface navigation and text input is needed to interact with services. It is known from U.S. Pat. No. 6,765,557 to use a touchpad for controlling a home entertainment device such as an Interactive television, thereby improving usability. In the U.S. Pat. No. 6,765,557, key inputting and the like using the touchpad are described as examples. In these examples, it would be conceived to use language constraints as described above to support user's inputting. However, the use of language constraints sometimes results in a failure of desired input of the key inputting.

SUMMARY

A language model back-off system can be used with a user interface employing one or more language models to constrain navigation of selectable user interface input components. A user input interpretation module receives user input and interprets the user input to determine if a selection is made of one or more user interface input components. If a selection is not made, the user input interpretation module determines whether conditions are met for backing off one or more language models employed to constrain navigation of the user interface input components. If the conditions are met, a language model back-off module backs off the one or more language models.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure is directed to a solution to the problem of providing valuable and intuitive feedback through an easy-to-use and exclusively on-screen user interface, controlled by a touch sensitive controller. The basic idea is that at any given time there will only be certain types of actions that are possible, and each action will have a different likelihood of being chosen. This type of structure is referred to herein as "language", and this structure is exploited to better guide the user to make choices with, for example, a pointing device. At the same time, it is desirable to allow the user to make new choices that may not be represented in the original language. To provide this capability, there is a need to relax the language constraints when the user needs full freedom of choice. It is desirable to perform this relaxation automatically (i.e., without the user having to explicitly ask for it). To provide this capability, some embodiments can use trajectories of the pointer(s), the speed of movement of the pointers, and the delay in between clicks as feature vectors. These feature vectors can then be related to the language model in a probabilistic way. In additional or alternative embodiments, a "Visual back-off" can be introduced when needed (i.e., a relaxed version of the language model that will be represented visually and in a time-varying manner, and that will allow the user to make out-of-language choices).

Figure 1:
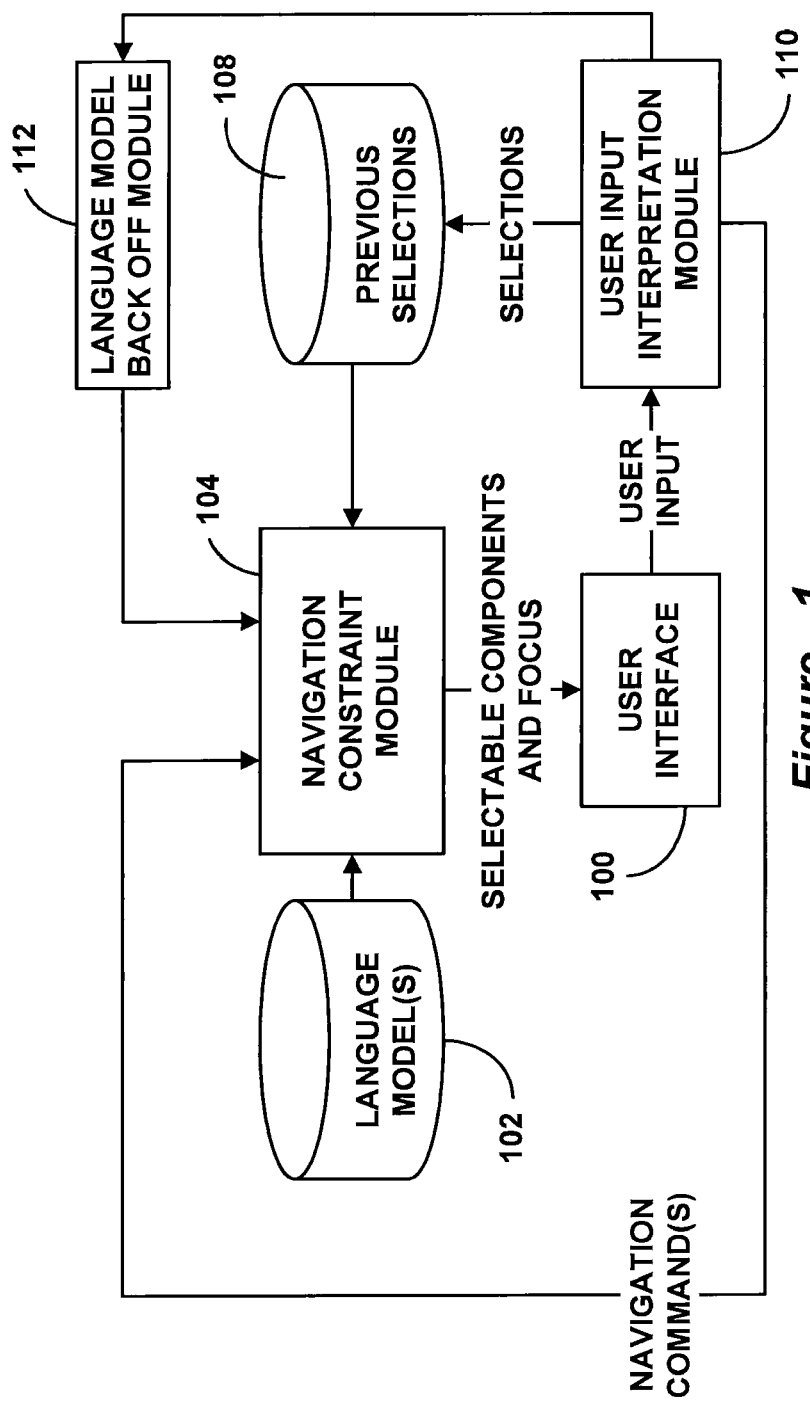
FIG. 1 is a block diagram illustrating a language model back-off system for use with a user interface employing one or more language models to constrain navigation of selectable user interface input components.

Referring to FIG. 1, a language model back-off system can be used with a user interface 100 employing one or more language models 102 to constrain navigation of selectable user interface input components. Navigation constraint module 104 employs the one or more language models 102 to constrain the user navigation, such as focus shift, according to previous selections 108 made by the user. User input interpretation module 110 recognizes the user selections, and also evaluates other user input and conditions to determine whether conditions are met for backing off the one or more language models 102. If the conditions are met, then language model back-off module 112 performs the back-off, and navigation constraint module 104 applies the backed off language models 102 to present the user with more choices by user interface 100.

Figure 2:
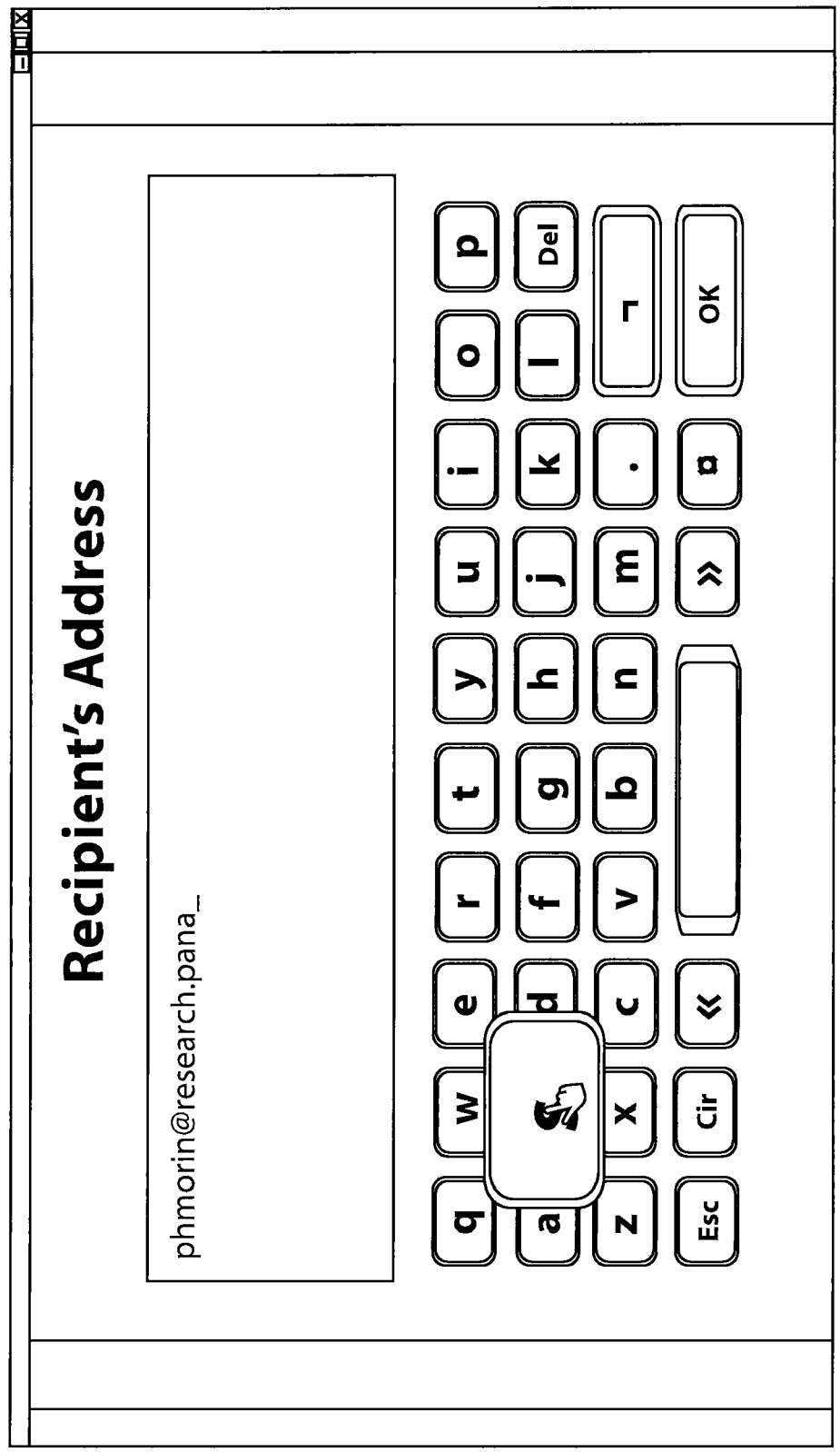
FIG. 2 is a view illustrating an on-screen keyboard with a single zone of interaction.

Turning now to FIG. 2, in some embodiments, the user interface 100 can represent an on-screen keyboard, where the purpose of the user is to write text, such as English words or email addresses (or web sites addresses, etc. etc.). In such a case, the language is therefore the English language, plus language regarding emails and internet addresses. However, it should be readily understood that the language model back-off system can be applied to any other on-screen user interfaces 100 where a series of actions need to be coordinated in order to achieve a particular goal.

Some embodiments of the language model back-off system can have one or more language models 102 of the form:

N-words: $p\{w(k)/w(k-1), \ldots, w(k-N)\}$

N-chars: $p\{c(k)/c(k-1), \ldots, c(k-N)\}$ where w(.) are words of the (in this case) English language, and c(.) are characters.

In some embodiments, a more stringently constrained mixed model can be used to predict the next character to be entered on the screen:

Mixed model: $p\{c(k)/c(k-1), \ldots, c(k-N), w(j-1), \ldots, w(j-M)\}$

This mixed model gives the probabilities of the next characters, knowing the previous N characters and the previous M words.

As described below, the navigation constraint module 104 constrains navigation of the user interface input components by controlling sizes of the components or attraction of a pointer to the components based on probabilities of the components being next selected as determined by employing the one or more language models 102. The operations of the navigation constraint module 104 are described below in more detail. The probabilities for the next characters can be employed to constrain the navigation by the user in various ways and to provide visual feedback. In the case of text input with a keyboard, for example, sizes of the keyboard keys can controlled based on the probabilities of the key characters being the next characters. Thus, keys can grow and shrink in size during the back-off process. Alternatively or additionally, keys can become highlighted based on the chafing value of the character probability. Alternatively or additionally, the pointer can be attracted by different keys that show the best probability that is in the proximity of the cursor at any given time. In some embodiments, such attraction can be performed by warping remote(x,y)—warp à screen(x,y) based on the probability field (from language constraints) of components on the screen. This process can make an attractor out of areas in screen(x,y) of higher probability compared to areas in screen(x,y) of lower probability. Since the probabilities of the components can change multiple times between selection events in response to the passage of time and/or other recognizable phenomenon as explained below, the probability field can change accordingly. Thus, the attractiveness of individual components and/or groups of components regarding the pointer can also change. It is envisioned that two or more of these visual constraint techniques can be employed in combination.

Compared to the N-words and/or N-chars models, the mixed model can be very constrained. For example, in the case of the word "probability," after spelling "pr" the model will provide non-zero probabilities for only the 6 vowels due to the English language morphological constraints. Consequently, if one were to constrain the user interface 100 to only allow the use of characters having non-zero probability as next characters, the user will never be able to enter a new word absent from the language (such as a foreign name or an abbreviation). The language model back-off system deals with this type of problem.

Figure 3:
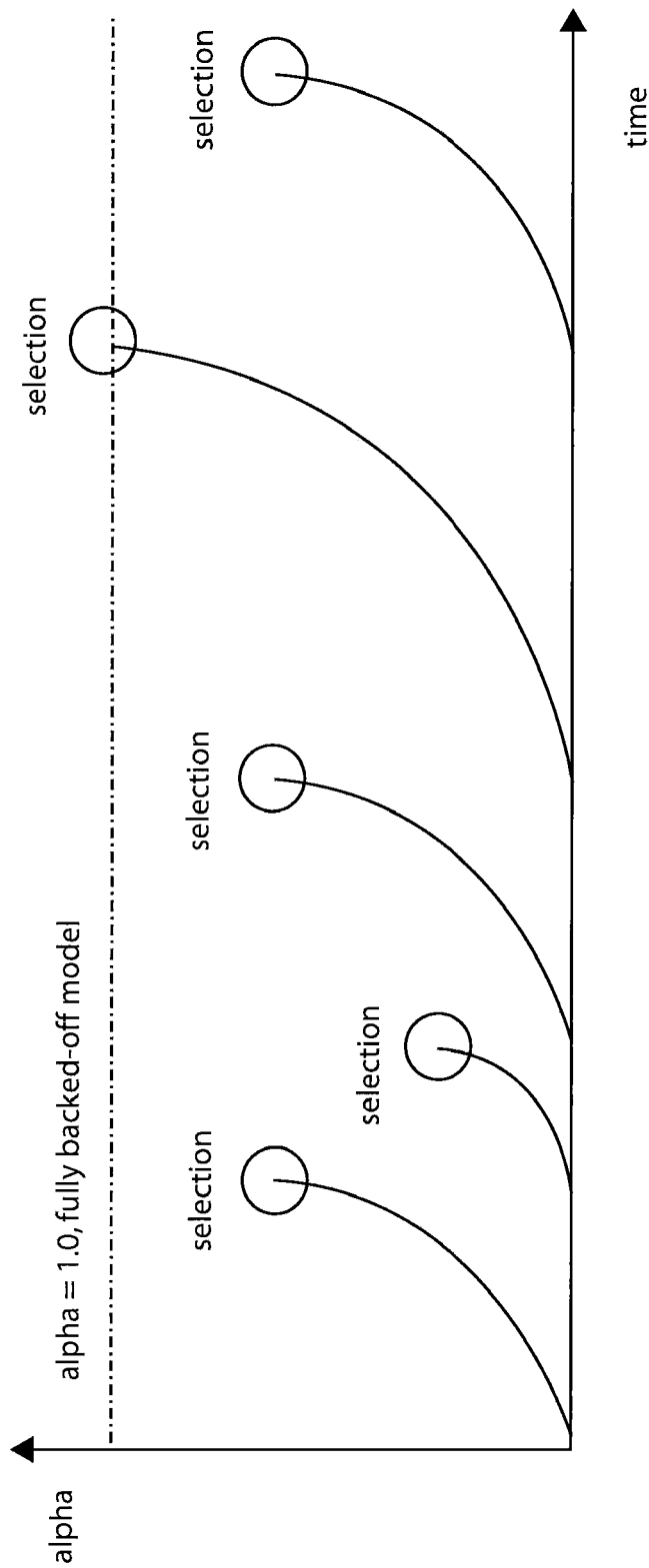
FIG. 3 is a graphical representation illustrating visual back-off based only on time features.

As described below, the language model back-off module 112 backs off the one or more language models 102 by adjusting weights of probabilities that are computed using multiple language models 102. The operations of the language model back-off module 112 are described below in more detail. Turning now to FIG. 3, the back-off of the mixed model in some embodiments can be seen as an interpolation between the mixed model and the N-chars model:

$P\_bk\{c(k)/c(k-1), \ldots, c(k-N)\} = \text{alpha}*p\{c(k)/c(k-1), \ldots, c(k-N)\} + (1-\text{alpha})*p\{c(k)/c(k-1), \ldots, c(k-N), w(j-1), \ldots, w(j-M)\}$ where alpha is a variable in [0-1]. The idea of the back-off in this case is to tie alpha to the user behavior as determined from the movements of the pointer. The high level idea is that if the user is not impressed by the choices given by the current constraints of the (mode constrained) mixed model, he will not make a selection, and his pointer will be wandering around a certain area that is not allowed by the current constraints. For instance, if the user wanted to enter the abbreviation "prb", and the mixed model would only allow for selecting "pr"[aoiuey], then the pointer would wander around the "b", but no selection would be made (click). Here, as described above, the user input interpretation module 110 determines whether the conditions for the back-off are met, based on a time since a previous selection 108, such as a time during the pointer is wandering. In order to allow for the input of the letter "b", the system can start relaxing the language models constraints by increasing the back-off constant alpha, from 0 to 1. That is, the language model back-off module 112 adjusts the weights to ensure that probabilities computed by employing a more highly constrained language model 102 are given less weight while probabilities computed by employing a less highly constrained language model 102 are given more weight. By doing so, the more highly constraint mixed model is given less weight as the less highly constrained N-chars model is given more weight. As a result, the user can be presented with more choices until he is eventually able to select the letter "b".

It should be readily understood that the back-off can be accomplished by adjusting weights for any number or types of language models 102 being interpolated. For example, language models of order N can themselves be backed off to language models of order N−1, N−2, down to order 1, in order to further relax constraints. Thus, in some embodiments, a 3-char language model can be further backed off to a 2-char language model and a 1-char language model, if the level of constraints need to further relaxed:

$P\_bak\{c(k)/c(k-1),c(k-2)\} = \text{beta}*p\{c(k)/c(k-1),c(k-2)\} + \text{gamma}*p\{c(k)/c(k-1)\} + \text{theta}*p\{c(k)\}$ where the sum of the coefficients beta, gamma, theta equals one. Under these assumptions the coefficients also need to be varies, for instance with respect to time, in order to change the level of constraints to be enforced during the interaction with the user.

In addition to time since a last selection, the back-off can also be dependent on user interaction with the input device of the user interface 100. That is, the user input interpretation module 110 determines whether the conditions are met by employing a probabilistic model taking into account a feature set of sensed user interaction with an input device of the user interface 100. For example, the back-off may not occur if the user is not actively interacting with the user interface 100, or if the user is interacting with the user interface 100 in a way that is not consistent with attempt to make a next selection. Also, the rate at which the back-off occurs can be dependent on how the user is interacting with the user interface. To accomplish this capability, some embodiments can employ a sensory model for user intentions prediction.

In a basic form of visual back-off, the time between clicks can play a major role. However, in a more general form of back-off, not only the time delay would be used for constraint relaxation, but a more general probabilistic model could be envisioned, that takes into account all features provided by the user as he operates the remote controller. For instance, in the case of a touchpad remote controller equipped with accelerometers and holding sensors, the following feature set can be packed in a feature vector v(t) for any given time t: (a) Dual finger position: (x1,y1), (x2,y2), and their (multiple) derivatives (x1,y1)', (x2,y2)', (x1,y1)", (x2,y2)", etc.; (b) Dual click events: cl1, cl2; (c) Dual finger pressure values: p1, p2; (d) Device acceleration: (ax, ay, az), and its integrals (vx, vy, vz), (x, y, z); and (e) Holding sensors output: (h1, . . . hn), and its derivatives. It is envisioned that additional or alternative types of sensory inputs can be employed in the feature set. Although not meant to be exhaustive, the following types of sensory inputs provide some non-limiting examples: (a) a finger position; (b) a click event; (c) an acceleration derivative; (d) a holding integral; (e) dual finger positions and their multiple derivatives; (f) dual click events; (g) dual finger pressure values; (h) input device acceleration and its integrals; or (i) holding sensors outputs and their derivatives.

In the context of the keyboard task in which one is looking for the next character input c(t), one can use the following model to detect user intention:

$c(t)$=argmax on $c$ of $P(c/V,C)$ . . . where $V$ are all the previous vector $v(0)$ . . . $v(t)$, and $C=\{c(0), \ldots c(t)\}$ Herein, user intention means which of the following user interface elements the user intends to select next.

By using a generative model M, the maximum likelihood solution can be derived under some conditional independence assumptions:

$c(t)$=argmax on $c$ of $P(v(t)/c,C,M)*P(c/V,C,M)$=argmax on $c$ of $P(v(t)/c,M)*p(c/C)$ This formula shows the factorization between sensory model $P(v(t)/c,M)$ and language model $p(c/C)$. In case the language has a word structure, the language model can be further conditioned by words, to fall back to the previous expressions.

Under this framework the maximum likelihood solution of the user intention can be efficiently solved by Viterbi decoding, under the constraints of sensory and language models 102 estimated on a training data set. Also, the back-off language model can be directly integrated in this framework, in a maximum likelihood way, by computing fixed back-off weights and letting the Viterbi decoding choose the right path based on the maximum likelihood from observations. One can alternatively or additionally apply standard adaptation techniques used in statistical modeling in order to refine the initial model (that would ship with the product) in order to yield increasing accuracy with time, by adjusting both on the sensory model and the language model 102 to the user operation pattern.

Figure 4:
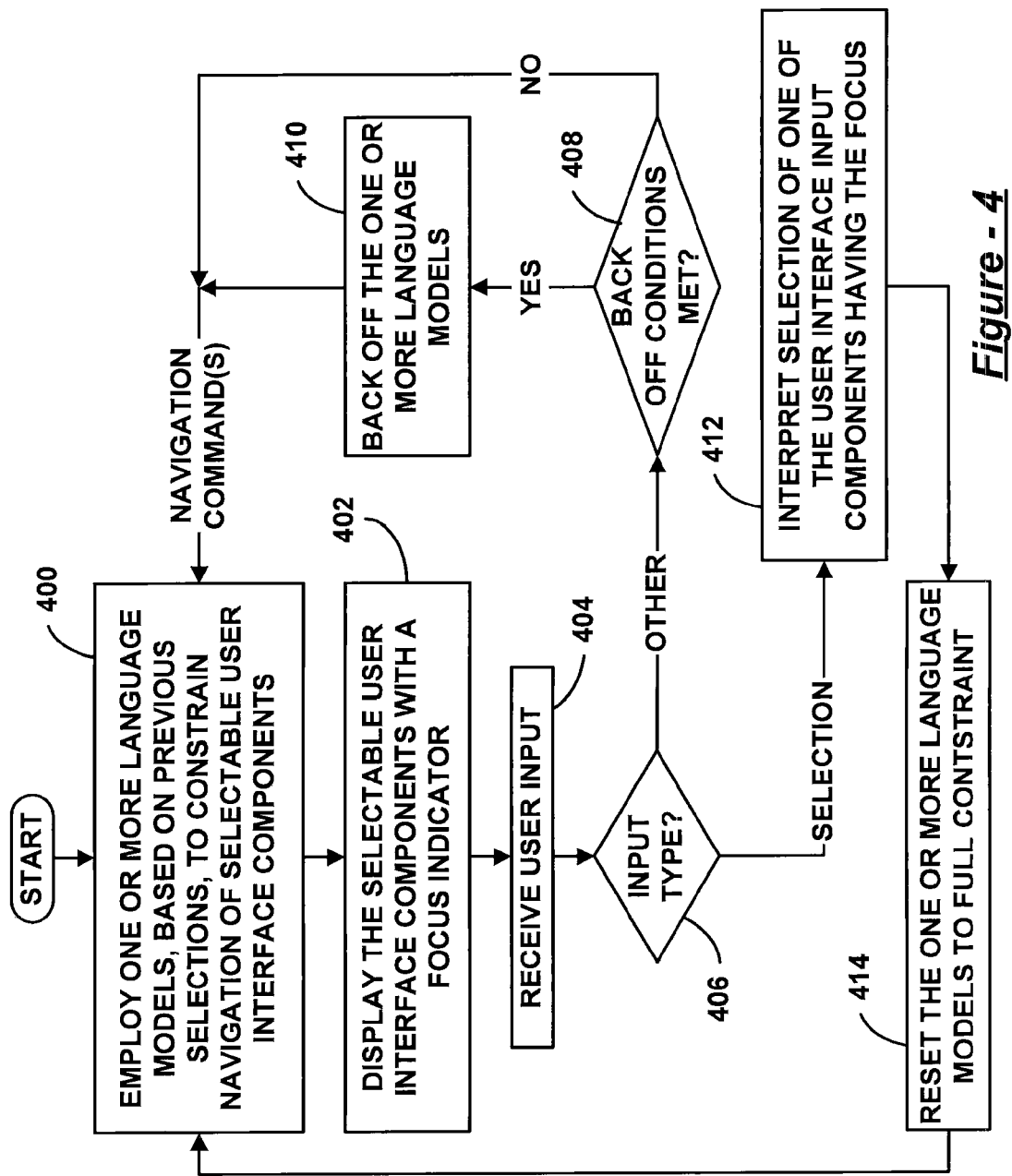
FIG. 4 is a flow diagram illustrating a language model back-off method for use with a user interface employing one or more language models to constrain navigation of selectable user interface input components.

Turning finally to FIG. 4, a language model back-off method can be used with a user interface 100 that employs one or more language models 102 to constrain navigation of selectable user interface input components at step 400. The selectable user interface input components can thus be displayed to the user with a focus indicator, such as a pointer, highlight, etc. at step 402. That is, the user interface 100 displays the user interface input components with a focus indicator. The constraint can be applied by using the probabilities of the next selections to controls size of the components and/or attracting the pointer to the components having the higher probabilities of being selected. In his way, user navigation can be restricted to those components having probabilities of being selected that are above a threshold.

When user input is received at step 404, the input type is interpreted at decision step 406 to determine at least whether a selection has been made. In other words, the user input interpretation module 110 receives the user input, and interprets the input type to determine whether or not a selection has been made. If not, as described above, then the non-selection input is interpreted at decision step 408 to determine whether conditions have been met for backing off the one or more language models 102. In other words, the user input interpretation module 110 determines whether or not conditions have been met for backing off the one or more language models 102. If the conditions are met, then the one or more language models 102 are backed off at step 410. In other words, the language model back-off module 112 backs off the one or more language models 102. For example, weights applied to two or more language models 102 can be adjusted at step 410 in order to increase weight given to a less constrained model and decrease weight given to a more constrained model. Navigation commands, such as pointer movement commands, are then processed at step 400 with the backed off language model(s) 102.

When a selection is observed at decision step 406, then the user interface input component currently having the focus is selected at step 412. Thereafter, the backed off language model can be reset to be fully constrained at step 414. In other words, the navigation constraint module 104 constraints navigation of the user interface input component, and then resets the language model 102 that have been backed off. Processing then returns to step 400 for interpreting the next selection by the user.

From the forgoing description, it should be readily understood that the systems and methods described herein obtain a number of advantages. For example, they provide a consistent framework for detecting user intentions based on sensory data and "language" constraints. Also, they provide an efficient and optimal maximum likelihood algorithm for detecting user intentions within such a framework. Additionally, they provide a solution to the problem of relaxation of constraints, that is both optimal in terms of seek time (the time the user takes to make a selection), and that is relaxed enough to allow the user to enter new "words" that are not initially included in the language without hindrance. Further, they provide an integrated solution to report back to the user, in a visual form, the status of the system, in a way that both guides the user to make a quick selection and allows the user to make such a selection with minimal cognitive load.

The invention claimed is:

1. A language model back-off system for use with a user interface employing one or more language models to constrain navigation of selectable user interface input components representing a set of characters based on at least one previously received user interface input component, the system comprising:

a user input interpretation module receiving user input and interpreting the user input to determine if a selection is made of one or more user interface input components, wherein said user input interpretation module, if a selection is not made, determines whether conditions are met for replacing at least one of the one or more language models employed to constrain navigation of the user interface input components with a replacement language model, wherein the replacement language model defines a set of selectable user interface components that is different than the set of user interface components defined by the one or more language models that are to be replaced; and a language model back-off module replacing at least one of the one or more language models with the replacement language models if the conditions are met, further comprising a user interface displaying the user interface input components with a focus indicator, the focus indicator operable to visually differentiate between selectable user interface input components and non-selectable user interface input components pursuant to the one or more employed language models.

2. The system of claim 1, further comprising a navigation constraint module employing the one or more language models, based on previous user interface input component selections, to constrain navigation of the selectable user interface input components.

3. The system of claim 2, wherein said navigation constraint module constrains navigation of the user interface input components by controlling sizes of the components based on probabilities of the components being next selected as determined by employing the one or more language models.

4. The system of claim 2, wherein said navigation constraint module constrains navigation of the user interface input components by controlling attraction of a pointer to the components based on probabilities of the components being next selected as determined by employing the one or more language models.

5. A language model back-off method for use with a user interface employing one or more language models to constrain navigation of selectable user interface input components representing a set of characters based on at least one previously received user interface input component, the method comprising:

receiving user input and interpreting the user input to determine if a selection is made of one or more user interface input components;

if a selection is not made, determining whether conditions are met for replacing at least one of the one or more language models employed to constrain navigation of the user interface input components with a replacement language model, wherein the replacement language model defines a set of selectable user interface components that is larger than the set of user interface components defined by the one or more language models that are to be replaced; and if the conditions are met, replacing at least one of the one or more language models with a replacement language model.

6. The method of claim 5, further comprising displaying the user interface input components with a focus indicator, the focus indicator operable to visually differentiate between selectable user interface input components and non-selectable user interface input components pursuant to the one or more employed language models.

7. The method of claim 6, further comprising employing the one or more language models, based on previous selections, to constrain navigation of the selectable user interface input components.

8. The method of claim 7, further comprising constraining navigation of the user interface input components by controlling sizes of the components based on probabilities of the components being next selected as determined by employing the one or more language models.

9. The method of claim 7, further comprising constraining navigation of the user interface input components by controlling attraction of a pointer to the components based on probabilities of the components being next selected as determined by employing the one or more language models.

10. The method of claim 5, further comprising replacing at least one of the one or more language models with the replacement language model by adjusting weights of probabilities that are computed using multiple language models.

11. The method of claim 10, further comprising adjusting the weights to ensure that probabilities computed by employing a more highly constrained language model are given less weight while probabilities computed by employing a less highly constrained language model are given more weight.

12. The method of claim 5, further comprising determining whether the conditions are met based on a time since a previous selection.

13. The method of claim 5, further comprising determining whether the conditions are met by employing a probabilistic model taking into account a feature set of sensed user interaction with an input device of the user interface.

14. The method of claim 13, further comprising employing a feature set including at least one of the following sensory inputs:
    (a) a finger position;
    (b) a click event;
    (c) an acceleration derivative;
    (d) a holding integral;
    (e) dual finger positions and their multiple derivatives;
    (f) dual click events;
    (g) dual finger pressure values;
    (h) input device acceleration and its integrals; or
    (i) holding sensors outputs and their derivatives.

15. A language model back-off system for use with a user interface employing one or more language models to constrain navigation of selectable user interface input components representing a set of characters based on a previously received user interface input component, the system comprising:

a user interface displaying the user interface input components with a focus indicator, the focus indicator operable to visually differentiate between selectable user interface input components and non-selectable user interface input components pursuant to the employed one or more language models;

a navigation constraint module employing the one or more language models, based on previous user interface input component selections, to constrain navigation of the selectable user interface input components;

a user input interpretation module receiving user input and interpreting the user input to determine if a selection is made of the one or more user interface input components, wherein said user input interpretation module, if a selection is not made, determines whether conditions are met for replacing at least one of the one or more language models with a replacement language model, wherein the replacement language model defines a set of selectable user interface components that is larger than the set of user interface components defined by the one or more language models that are to be replaced, based on: (a) a time since a previous selection; and (b) a probabilistic model taking into account a feature set of sensed user interaction with an input device of the user interface; and a language model back-off module replacing at least one or more of the one or more language models with the replacement language model if the conditions are met by adjusting weights of probabilities that are computed using multiple language models to ensure that probabilities computed by employing a more highly constrained language model are given less weight while probabilities computed by employing a less highly constrained language model are given more weight.

* * * * *